United States Patent [19]

Selbak

[11] Patent Number: 5,223,286
[45] Date of Patent: Jun. 29, 1993

[54] EDIBLE, HAND HELD CONTAINERS MADE OF COOKIE DOUGH AND METHOD AND APPARATUS FOR MAKING THE SAME

[75] Inventor: Will L. Selbak, Duluth, Minn.

[73] Assignee: Selbak's Cookie Cones, Inc., Maple Grove, Minn.

[21] Appl. No.: 630,312

[22] Filed: Dec. 19, 1990

Related U.S. Application Data

[63] Continuation-in-part of Ser. No. 460,469, Dec. 29, 1989, abandoned.

[51] Int. Cl.⁵ .............................................. A21D 13/08
[52] U.S. Cl. .................................. 426/94; 426/138; 426/139; 426/512
[58] Field of Search .................. 426/138, 139, 94, 512

[56] References Cited

U.S. PATENT DOCUMENTS

| | | | |
|---|---|---|---|
| 2,404,177 | 7/1946 | Jetschmann | 426/139 |
| 3,290,154 | 12/1966 | Turner | 426/139 |
| 3,410,691 | 11/1968 | Stanley | 426/138 |
| 3,526,515 | 9/1970 | Werbin et al. | 426/139 |
| 3,541,587 | 11/1970 | Washburn et al. | 426/139 |
| 4,104,405 | 8/1978 | Forkner | 426/94 |
| 4,205,091 | 5/1980 | Van Horne | 426/139 |
| 4,303,690 | 12/1981 | Haas et al. | 426/138 |
| 4,313,964 | 2/1982 | Dembecki | 426/138 |
| 4,439,343 | 3/1984 | Albanese | |
| 4,505,220 | 3/1985 | Bank et al. | 118/16 |
| 4,600,591 | 7/1986 | Galli | 426/139 |
| 4,749,583 | 6/1988 | Branch | 426/138 |
| 4,812,323 | 3/1989 | Savage | 426/139 |

Primary Examiner—Jeanette Hunter
Assistant Examiner—Mary S. Mims
Attorney, Agent, or Firm—Dorsey & Whitney

[57] ABSTRACT

An edible, hand held food product that may be used as a container for ice cream and other frozen confections is formed from a shell of baked cookie dough. Unlike traditional wafer ice cream cones, the thickness of the wall of the ice cream cone of the present invention is at least approximately ⅛" thick. The cookie dough that is used to produce the ice cream cone of the present invention is normal cookie batter comprised of a liquid, eggs, shortening, flour, sugar, and dry flavoring ingredients, with a reduced amount of leavening agent (i.e. baking powder, baking soda or cream or tarter). The leavening agent is approximately 10–60% by volume of the amount of leavening agent used in normal cookie dough recipes.

22 Claims, 4 Drawing Sheets

EDIBLE, HAND HELD CONTAINERS MADE OF COOKIE DOUGH AND METHOD AND APPARATUS FOR MAKING THE SAME

This is a continuation-in-part application of application Ser. No. 460,469 filed Dec. 29, 1989, now abandoned.

TECHNICAL FIELD

This invention relates generally to ice cream cones and other edible, hand held containers and to methods and apparatus for producing the same. More particularly, the present invention relates to a method and apparatus for producing edible, hand held ice cream and other frozen confection containers made of cookie dough.

BACKGROUND ART

Traditional ice cream cones, and the methods and apparatus for making such cones, are well known in the prior art. There are generally two types of edible, hand held containers or cones capable of holding ice cream or other frozen confections, such as yogurt: wafer or cake cones and sugar or waffle cones. Wafer or cake cones are baked in molds using what is generally referred to in the art as a "liquid" dough generally composed of water, flour and sugar, wherein the sugar content of the dough is relatively low, 6 or 7% by weight. Wafer or cake cones are generally 1/32" to 1/16" thick and are baked between 1 to 1½ minutes. Sugar or waffle cones, on the other hand, are baked flat and then rolled into a cone shape using a dough having a relatively high sugar content, 25% or more by weight. U.S. Pat. No. 3,541,587, describes a sugar cone having 15% sugar by weight and at least 0.5% by weight of a high amylose starch that prevents sticking so the sugar cone can be made using molds like a wafer or cake cone.

While one of the primary functions of an ice cream cone is to hold the ice cream or other frozen confection, the cone itself is also to be consumed. Various methods and products have been created to enhance the enjoyment of eating an ice cream cone by making changes to the flavor and taste of the cones. For example, U.S. Pat. No. 4,104,405 describes a cone having an expanded confection ring around the top of the cone, U.S. Pat. No. describes an apparatus for coating the interior of the cone with a chocolate layer, and U.S. Pat. No. 4,600,591 describes a cone comprised of a pair of concentric tapped wafer cones having a layer of cream interposed between the two wafer cones.

Although such products have enhanced the enjoyment of eating ice cream, the primary edible, hand held containers for ice cream and other frozen confections continue to be some form of the traditional sugar or wafer cones. Accordingly, it would be desirable to provide an edible, hand held container with enhanced flavor and a method and apparatus for producing edible, hand held ice cream containers using a different and more flavorful type of dough, for example, cookie dough.

SUMMARY OF THE INVENTION

The present invention provides for an improved edible, hand held food product useful as a container for ice cream and the like and a method and apparatus for producing an edible food product that may be used as a container for ice cream and other frozen confections. The food product is a generally cone shaped shell of baked cookie dough for holding ice cream or the like and is made from a "solid" dough as compared to the "liquid" dough used in the making of prior art wafer or cake cones. Unlike traditional wafer or cake ice cream cones, the thickness of the wall of the ice cream cone of the present invention is at least approximately ⅛" thick.

The cookie dough that is used to produce the ice cream cone of the present invention is a "solid" dough in the form of normal cookie batter comprised of a liquid, eggs, shortening, flour, sugar, and dry flavoring ingredients, with a reduced amount of leavening agent (i.e. baking powder, baking soda or cream of tartar). In the dough used with the present invention, the leavening agent is approximately 10–60% by volume of the amount of leavening agent used in normal cookie dough recipes. This represents a leavening agent component in which the ratio of the leavening agent component to the flour component is no greater than about 1.75 by weight and preferably no greater than about 1:100. Most preferably such ratio is between about 1:100 and 1:400. The dry flavoring ingredients are selected from the group of ingredients typically found in cookie recipes, such as spices, rolled oats, coconut, raisins and the like.

The apparatus used to produce the ice cream cone of the present invention is comprised of a mold having two concentric portions, a female portion for receiving the cookie dough and a male portion for insertion into said female portion. Means are also provided for establishing a concentric or constant gap of at least approximately ⅛" and not larger than approximately ½" between the inner surfaces of the mold portions. The mold includes means for registering the male and female portions of the mold to maintain the concentric gap during the baking of the ice cream cones. The mold portions may be in the form of an automated cone making machine or in the form of a pair of cone forming pans with a plurality of cone shaped configurations. When using the pair of cone forming pans, a plurality of breathing channels are provided to allow gases and moisture to be expelled from the interior of the mold during baking. When using an automated cone making machine, the containers of the present invention are preferably removed by vacuum in the manner described in greater detail below.

Briefly, the automated method for producing the ice cream cone of the present invention starts by combining flour, sugar, a reduced amount of leavening agent and one or more dry flavoring ingredients with a liquid, a shortening and eggs to create a "solid" cookie dough. A measured amount of the cookie dough is placed into the preheated female portion of the mold and the preheated male portion of the mold is inserted into the female portion until a concentric gap of at least approximately ⅛" and not larger than approximately ½" is created between said portions. During this insertion, the dough is formed into the shape of the gap defined by the mold portions. In the automated version of the preferred method, the female and male mold portions are separately heated and are heated to temperatures in which the temperature of the male mold portion is at least about 10° C. and preferably between about 10° and 30° C. higher than the temperature of the female mold portion.

The cookie dough is then baked for about 2 to 5 minutes to create a baked shell that is the ice cream cone of the present invention. During this baking step, the male mold portion is repeatedly moved away from the molded cookie dough to allow for the release of moisture and other gases in the dough and then back into engagement with the dough to maintain the same in its desired shape. Preferably, for chocolate chip cookie dough, this relative movement of the mold portions occurs at least 5 times during the first minute of baking and preferably the male mold portion is in its dough engaged position not more than about 30 seconds during the first minute of baking. After baking, with the mold in its closed position for about an additional two minutes, the baked shell is removed from the mold and allowed to cool until firm enough to hold its shape. In the method of the present invention, the cones are removed by a vacuum process and are placed into cone shaped receptacles to cool.

In the manual process utilizing a pair of mold pans, a measured amount of the cookie dough is placed in the female portion. The male portion is then clamped into engagement with the female portion so that a gap exists between the cone portions. The mold sections are then placed into an oven for baking.

When the cookie dough recipe for the manual process calls for certain meltable or moisture absorbing particulate ingredients, such as chocolate chips, baking chips, nuts and candy pieces, the method described above further includes the steps of cooling the moisture absorbing particulate ingredients and the cookie dough to between approximately 55° to 65° F. and admixing the moisture absorbing particulate ingredients with the cookie dough just prior to placing the cookie dough in the female portion of said mold. This minimizes the bleeding or melting of the moisture absorbing particulate ingredients during baking and also minimizes the tendency for the moisture absorbing particulate ingredients to absorb moisture from the cookie dough, thereby drying out the cookie dough and creating a baked shell that is subject to crumbling.

It is accordingly an objective of the present invention to provide an edible, hand held food product that may be used as a container for ice cream and other frozen confections and that is made of cookie dough.

It is a further objective of the present invention to provide a method and apparatus for making such an edible food product.

These and other objectives of the present invention will become apparent with reference to the drawings, the detailed description of the preferred embodiment and the appended claims.

DESCRIPTION OF THE PREFERRED EMBODIMENT AND METHOD

Figure 1:
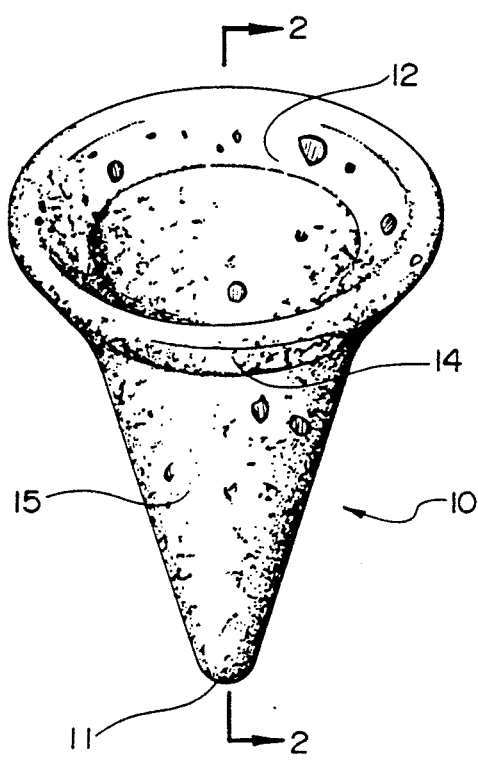
FIG. 1 is a perspective view of an edible, hand held ice cream cone in accordance with the preferred embodiment of the present invention.
Figure 2:
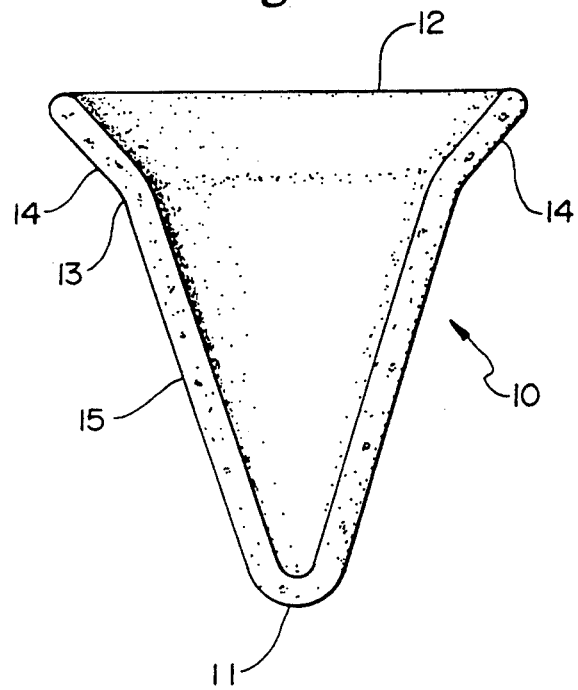
FIG. 2 is a sectional view taken along line 2—2 of FIG. 1.

Referring now to FIGS. 1 and 2, the preferred embodiment of an edible, hand held container 10 for ice cream and other frozen confections will be described. In the preferred embodiment, the container 10 is a generally cone shaped shell having an upper opening 12 for receiving a serving of ice cream or other frozen confections, such as ice milk, frozen yogurt, etc. An outwardly tapered lip portion 14 is provided to aid in keeping the ice cream or other frozen confection within the body of the container 10. The lip portion 14 also helps prevent the frozen confection from melting onto the person holding the container. The lip 14 joins with a tapered exterior wall 15 at the juncture 13. The tapered wall converges to a lower point 11. In the preferred embodiment, the walls of the container 10 are preferably greater than $\frac{1}{8}$" and less than $\frac{1}{2}$" thick and most preferably between about 3/16" to $\frac{1}{4}$" thick. If the walls are less than $\frac{1}{8}$" thick, the cookie dough that forms the walls will not be strong enough to receive a serving of ice cream or other frozen confection. On the other hand, if the walls are greater than $\frac{1}{2}$" thick, the baking time for the container becomes too great and the container 10 may not be completely baked or may be burned on the outside.

Figure 3:
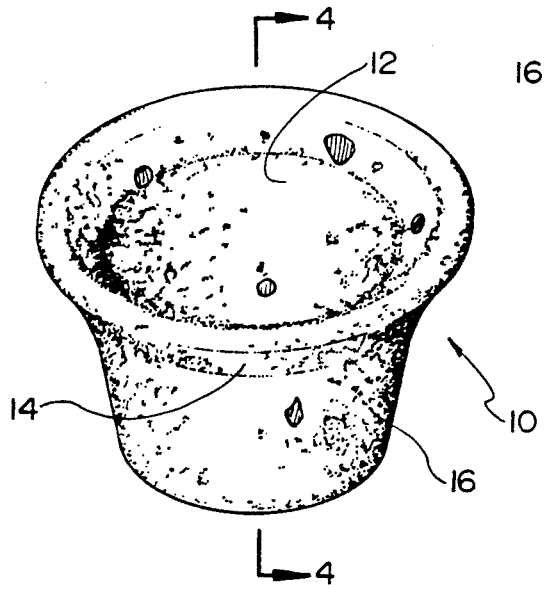
FIG. 3 is a perspective view of an edible, hand held ice cream cup in accordance with the present invention.
Figure 4:
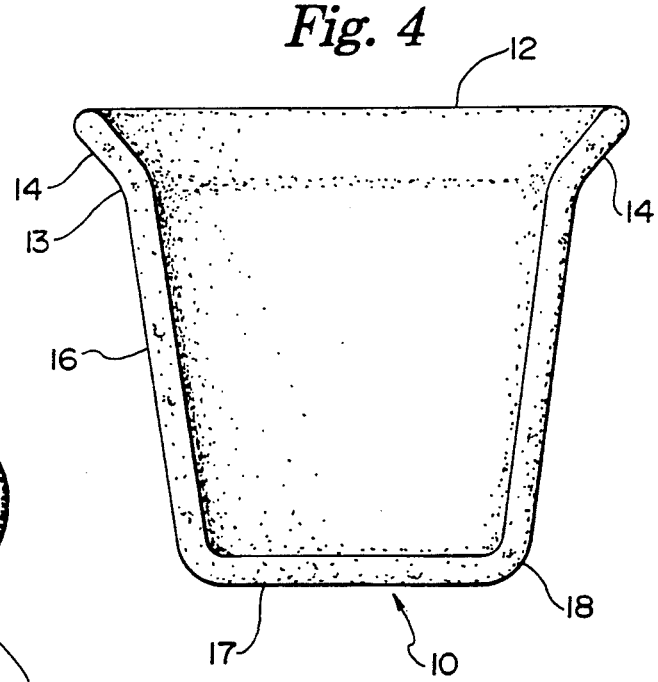
FIG. 4 is a sectional view taken along line 4—4 of FIG. 3.

An alternate shape of the container 10 of the present invention in the form of a cup is shown in FIGS. 3 and 4. The container of FIGS. 3 and 4 includes an outwardly tapered lip 14, a side wall 16 joining with the lip 14 at the juncture 13, and a bottom 17. The bottom 17 joins with the wall 16 along the edge 18. It will be recognized that the container 10 of the present invention may be made in any number of shapes and sizes so long as the container 10 is suitable for receiving a serving of ice cream or another frozen confection and is capable of being hand held. It should also be noted that the container shapes of FIGS. 1-4 include a variety of corners, points and/or edges to facilitate the hand held nature thereof.

Figure 5:
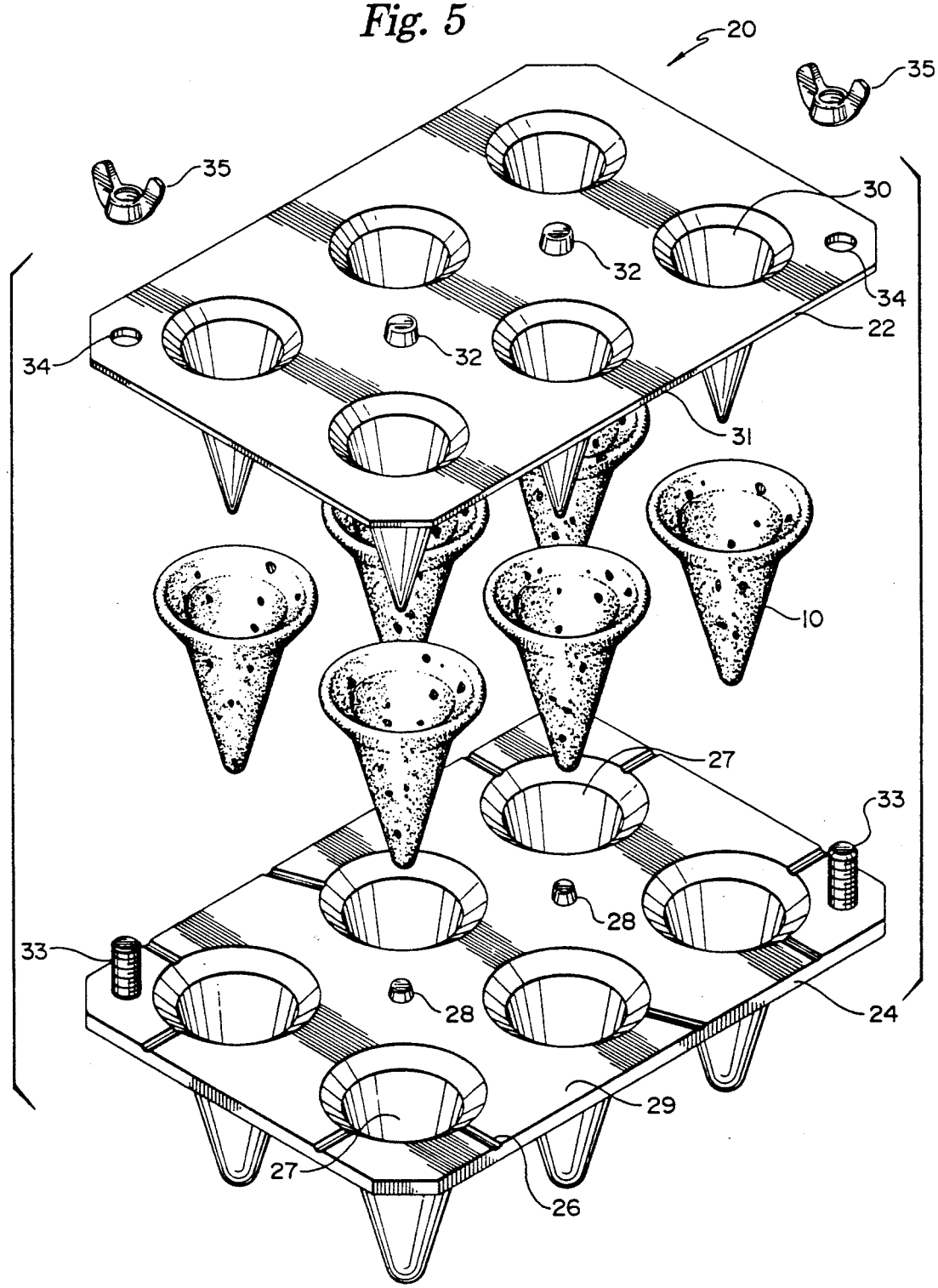
FIG. 5 is a perspective view of the preferred embodiment of a mold to produce the cone of FIG. 1 in accordance with the present invention.
Figure 6:
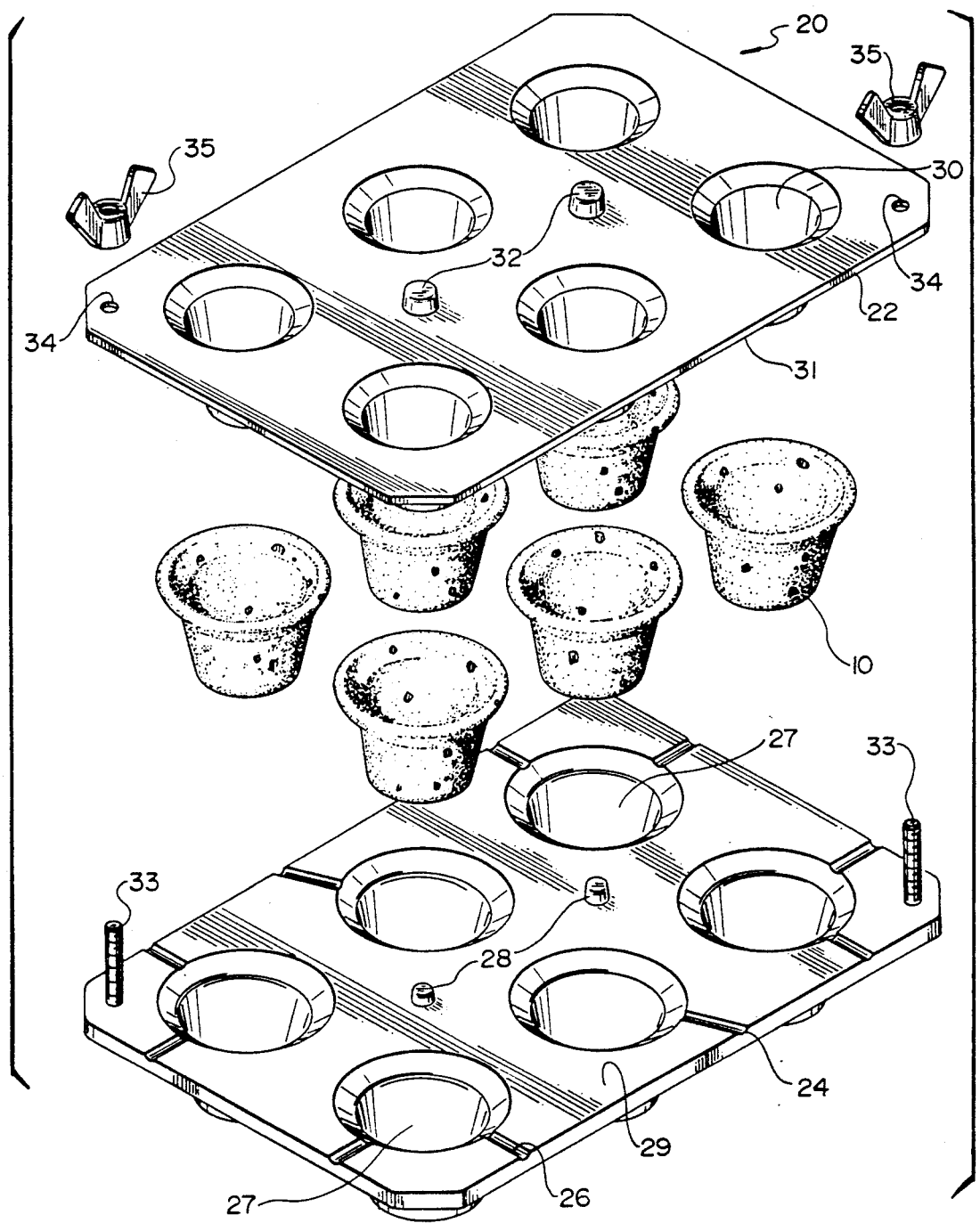
FIG. 6 is a perspective view of a mold to produce the cup of FIG. 3 in accordance with the present invention.

Referring now to FIGS. 5 and 6, two alternative molds 20 for use with the present invention are shown. The molds 20 as shown in FIGS. 5 and 6 are similar to muffin pans in construction and are intended principally for use in the manual version of making the containers. In FIG. 5, a generally cone shaped shell similar to that illustrated in FIGS. 1 and 2 is created by the interaction of the male portion 22 and female portion 24 while in FIG. 6 a cup shaped shell similar to that of FIGS. 3 and 4 is created. The female portion 24 includes a generally flat top surface 29 provided with a plurality of recessed mold shells or cavities 27 corresponding in configuration and size to the exterior of the cone shaped containers illustrated in FIGS. 1-4. Formed in the top surface 29 are a pair of location members or pins 28, 28 adapted for cooperation with corresponding locating recesses 32, 32 formed on the bottom side of the male mold portion 22. The male mold portion 22 is provided with a flat lower surface 31 adapted for engagement with the top surface 29 of the female mold portion 24 and a plurality of mold plugs 30 extending downwardly from the lower surface 31. These plugs 30 conform in size and configuration to the interior surface of the cone shaped containers illustrated in FIGS. 1-4.

Clamping means are also provided in the embodiments of FIGS. 5 and 6 to clamp the male and female portions 22 and 24 together during baking. In the preferred embodiment, the clamping means includes a pair of upstanding threaded portions 33 extending upwardly from the top surface 29 of the female mold portion 24, a corresponding pair of clamp openings 34 in the male mold portion 22 and a pair of wing nuts 35 which are threadedly received by threaded members 33 after the male portion 22 is properly positioned relative to the female mold portion 24. It is contemplated, of course, that other clamping means could be utilized such as toggle or cam mechanisms, quick clamp devices and the like. The female portion 24 also includes a plurality of breathing channels 26 associated with each shell of the mold 20 to allow the cookie dough to breath and to allow moisture and other gases to be released during the baking process.

If the container 10 of the present invention is to be mass produced via an automated procedure, a fully automatic, high-output ice cream cone oven may be utilized. In the preferred embodiment, a STAK oven available from Franz Haas Waffelmashinen, Industrielgesellschafht m.b.h, Wein, Austria is modified for use with the present invention. In this oven, the batter pump and extruder tubes are modified to accept the denser "solid" cookie dough batter of the present invention. In addition, the speed of the endless chain conveying the molds is decreased so that the baking time can be increased to about 2 to 6 minutes, if necessary.

The present invention may use any of a number of normal cookie dough recipes with a reduced amount of leavening agent. Such recipes start by combining flour, sugar, a reduced amount of leavening agent and one or more dry flavoring ingredients with a liquid, a shortening and eggs to create a "solid" cookie dough. If the leavening agent is baking powder, the recipe is modified by using between about 25-60% of the normal amount of baking powder called for in the recipe. If the leavening agent is baking soda, the recipe is modified by using between about 10-40% of the normal amount of baking soda called for in the recipe. Accordingly, the cookie dough recipes useful in the present invention have a leavening agent in which the ratio of leavening agent to flour, by weight, is less than about 1:75, and preferably less than about 1:100. Most preferably such ratio is between about 1:100 and 1:400.

Additionally, when making the containers manually, without automated equipment, and when the cookie dough recipe calls for certain meltable or moisture absorbing particulate ingredients, such as chocolate chips, baking chips, nuts and candy pieces, these ingredients are not added to the dough as called for in the recipe. Instead, the moisture absorbing particulate ingredients and the cookie dough are both cooled to between approximately 55° to 65° F. Neither the dough or particulate ingredients should be cooled for more than 3-6 hours or the dough may become too dry. After the dough and particulate ingredients are cooled, they are admixed just prior to placing the cookie dough in the mold. This minimizes the bleeding or melting of the moisture absorbing particulate ingredients during baking and also minimizes the tendency for the moisture absorbing particulate ingredients to absorb moisture from the cookie dough, thereby drying out the cookie dough and creating a baked shell that is subject to crumbling.

Set forth below are several samples of cookie dough recipes in accordance with the present invention:

Recipe 1

| WHITE CHOCOLATE CHUNK/MACADAMIA NUT COOKIE CONES/BOWLS | |
|---|---|
| ¾ cup butter, softened | 3 tablespoons granulated sugar |
| ½ cup light brown sugar | 1 large egg |
| 8 oz. white chocolate | 1 teaspoon vanilla |
| 1¼ cups flour | ½ cup chopped macadamia nuts |
| ¼ teaspoon baking soda | |

Place butter in a heavy medium-sized saucepan over medium-low heat and heat until butter boils and bubbles very gently but steadily. Adjust heat as necessary to prevent butter from burning, and continue simmering uncovered for 4 to 5 minutes or until it is golden but not browned, stirring frequently. Immediately remove pan from heat and stir in brown sugar. Pour into a large mixing bowl and refrigerate 50 to 60 minutes, or until mixture re-solidifies but is not hard. Grate 3 ounces of the chocolate. Coarsely chop remaining chocolate. Set the two aside separately. Stir together flour, baking powder and salt and set aside. Remove bowl from the refrigerator and beat cooled butter-brown sugar mixture until lightened. Add granulated sugar and beat until fluffy and smooth. Beat in egg and vanilla. Beat in dry ingredients. Add grated chocolate, half of the chopped chocolate, and nuts and stir until well combined.

Recipe 2

| SUGAR COOKIE CONES/BOWLS | |
|---|---|
| 3¾ cups flour | 1⅝ cups granulated sugar |
| ½ teaspoon baking powder | 2 large eggs |
| ¼ teaspoon salt | 2½ teaspoons vanilla extract |
| 1 cup butter | |

Stir together flour, baking powder and salt and set aside. Place butter in a large mixing bowl and beat with an electric mixer on medium speed until light. Add sugar and beat until fluffy. Add eggs and vanilla, continue beating until thoroughly blended and smooth. Gradually beat in about half the dry ingredients using a large wooden spoon.

Recipe 3

| COOKIE CONES/BOWLS SNICKERDOODLES | |
|---|---|
| 3¼ cups flour | 2 cups granulated sugar |
| ½ teaspoon baking powder | 2 eggs |
| ¼ teaspoon salt | 1 tablespoon light corn syrup |
| ½ teaspoon cinnamon | 2½ teaspoons vanilla extract |
| 1 cup butter | |

Stir together the flour, baking powder, salt and ¼ teaspoon cinnamon. Place butter and sugar in a large mixing bowl and beat with an electric mixer until light and smooth. Add eggs and corn syrup and continue beating until thoroughly blended and smooth. Beat in vanilla. Gradually beat in half of the dry ingredients. As dough stiffens, stir in remaining dry ingredients.

Recipe 4

| KRUMKAKE COOKIE CONES (BOWLS) ||
|---|---|
| 6 eggs | ½ cup whipping cream |
| 2¼ cups of sugar | 3 cups flour |
| 1 cup melted butter | 2 tsp. almond flavoring |

Beat eggs until thick and lemon colored (10 minutes). Keep beating eggs and add sugar. Alternately add butter and almond flavoring, whipping cream and flour until completely mixed.

Recipe 5

| CHOCOLATE CHIP COOKIE/BOWLS ||
|---|---|
| 2¼ cups flour | ¾ cup brown sugar |
| ¼ teaspoon baking soda | 1 teaspoon vanilla |
| 1 teaspoon salt | 2 eggs |
| 1 cup soft butter | 12 ounces chocolate chips |
| ¾ cup sugar | 1 cup chopped nuts |

Combine flour, baking soda and salt; set aside. Combine butter, sugar and brown sugar and vanilla until creamy; beat in eggs. Add flour mixture. Add chocolate chips and nuts. Refrigerate dough, chocolate chips and nuts to 65 degrees and mix together just before baking.

After the cookie dough has been prepared as described above, measured amounts of the dough, preferably about 1½ ounce amounts, are placed into preheated female portions of the mold. The preheated male portions of the mold are then lowered into the female portions to a point where the distance between the two mold portions defines a gap corresponding to the desired thickness of the container and a cavity with the shape and configuration of the container. Preferably this distance is no less than ⅛" and no greater than ¼". During the lowering of the preheated male mold portion into the preheated female mold portion, the dough is caused to spread throughout the gap between the mold surfaces so that when the male mold portion is fully inserted, the dough will expand during baking to fill the cavity between the mold portions.

In the automated method, the respective mold surfaces are sparately preheated to the desired baking temperatures prior to placing the dough into the mold and squeezing the same to conform to the cavity as described above. The temperature of the male mold surface is hotter than that of the female mold surface and most preferably hotter by at least about 10° C. Most preferably, the male mold surface is heated to a temperature of between about 10° to 30° C. greater than the female portion. In the preferred procedure, the baking is carried out at temperatures between about 120° and 180° C. In the most preferred procedure, the lower mold surface is maintained at a temperature at about 140° C., while the male mold surface is maintained at a temperature of about 160° C.; thus, the difference is 20° C.

Following the insertion of the male mold portion into the female mold portion, the baking step continues. With respect to cookie doughs made in accordance with recipes following the present invention, the baking procedure during the first minute or so is important because of the moisture which is contained within the cookie dough, and because of the nature of the cookie dough itself. Thus, certain procedures are desirable for releasing moisture and other gases from the cavity between the respective mold surfaces, while still maintaining the dough in a desired shape and configuration. During the first minute or so of baking in the automated method, the male mold portion is repeatedly moved away from the female portion to a disengaged position and back into engagement with the shaped cookie dough to an engaged position. Preferably the male mold is moved to a disengaged position for a sufficient period of time to allow the moisture and other gases to be released from the cookie dough during baking and back to an engaged position for a period sufficient to maintain the cookie dough in its desired shape. This back and forth movement is repeated at least about 5 times and preferably at least about 8 to 15 times during the first minute of baking.

Further, during the first minute of baking, the time during which the male mold portion is in an engaged position should be quite short, and preferably only for a period of time to maintain the cookie dough in its desired shape and to prevent the same from sagging. Thus, during the first minute of baking, the total time during which the male mold portion is in a disengaged position should be greater than about 50% and preferably at least about 75% of the time. Most preferably, the male mold portion should be in a disengaged position at least about 95% of the time during the first minute of baking. After about the first minute, the baking continues with the male mold portion in its engaged or closed position until the container is fully baked. This will generally be about 2 to 6 minutes depending upon the baking temperatures and the particular dough involved.

Figure 7:
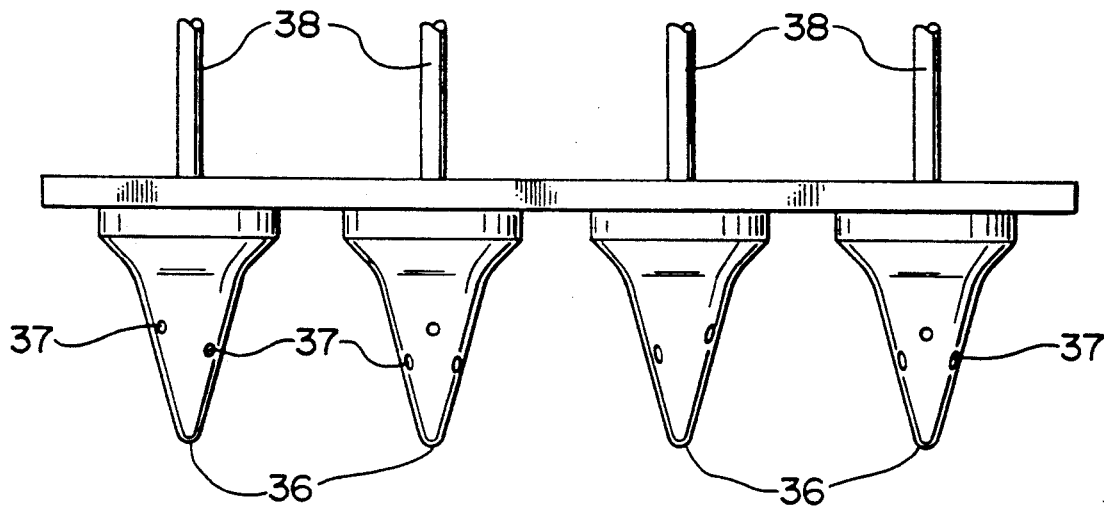
FIG. 7 is an elevational view of a device used to remove the containers from the female portion of the mold in accordance with the automated version of the method of the present invention.

When baking is complete, the male mold portions are withdrawn and the baked containers are removed from the female mold portions. Because of the nature of the cookie dough, this is accomplished in the preferred method by use of a vacuum. FIG. 7 illustrates an apparatus for removing the baked containers by vacuum. Specifically, such apparatus includes a plurality of vacuum plugs or cores 36 having an external size and configuration conforming substantially to that of the male mold portion. Each vacuum plug 36 includes one or more vacuum holes 37 on its surface which are in turn connected with a vacuum conduit 38. In the preferred method each of the vacuum conduits is connected with a separate vacuum source so that the failure to draw a vacuum in one of the plugs 36 (which might result for example from a broken container) will not affect the others. The apparatus of FIG. 7 is also provided with a means (not shown) for sensing whether or not a vacuum is drawn in each of the plugs 36.

Figure 8:
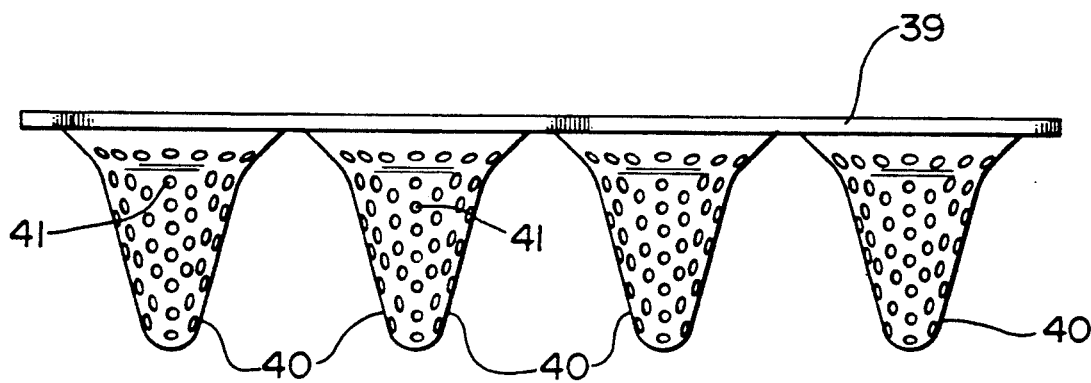
FIG. 8 is an elevational view of a cooling rack used in the method of the present invention.

After the containers have been removed from the female mold portions with the apparatus of FIG. 7, they are placed into a cooling rack 39 as shown in FIG. 8. The cooling rack 39 is provided with a plurality of cooling shells 40 each having a shell cavity with an inner surface conforming substantially in size and configuration to the inner mold surface of the female mold portion. The shells 40 are provided with a plurality of cooling holes 41. The containers are kept in the cooling rack until they are firm enough to hold their own shape, generally about 5 minutes.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

I claim:

1. An edible, hand held food product that may be used as a container for ice cream and other frozen confections, comprising a shell of baked cookie dough having an upper opening for receiving a serving of said ice cream and other frozen confections and a lower portion with a shape enabling said shell to be hand held, said lower portion including a tapered side wall extending from said upper opening to at least one of a lower point or corner to provide a hand grippable shape to facilitate the hand held characteristic of the product, said shell being at least about $\frac{1}{8}$" thick and said cookie dough having a levening agent and a flour component in which the weight ratio of leavening agent to flour is less than about 1:75.

2. The food product of claim 1 wherein the weight ratio of leavening agent to flour is between about 1:100 and 1:400.

3. The food product of claim 1 wherein said side wall includes an outwardly tapered lip extending from the top edge of said side wall and terminating in said upper opening.

4. The food product of claim 1 wherein the shape of said container is generally cone shaped.

5. The food product of claim 4 wherein said shell includes a side wall and an outwardly tapered lip extending from the top edge of said side wall and terminating in said upper opening.

6. The food product of claim 1 wherein the shape of said container is generally a cup-like shape.

7. The food product of claim 6 wherein said side wall includes an outwardly tapered lip extending from the top edge of said side wall and terminating in said upper opening.

8. A method for producing an edible, hand held food product that may be used as a container for ice cream and other frozen confections, comprising the steps of:
preparing a cookie dough;
providing a mold in which said mold includes two concentric portions, a female portion for receiving said cookie dough and a male portion for insertion into said female portion to define a cavity conforming to the desired container configuration;
preheating said mold portions to temperatures sufficient to bake said cookie dough in which the temperature of said male mold portion is greater than the temperature of said female mold portion;
placing a measured amount of said cookie dough into said female portion of said mold;
inserting said male portion into said female portion until a gap of at least approximately $\frac{1}{8}$" and not larger than approximately $\frac{1}{4}$" is created between said portions; and
baking said cookie dough.

9. The method of claim 8 wherein said male mold portion is preheated to a temperature at least about 10° C. greater than the temperature of said female mold portion.

10. The method of claim 8 comprising the further steps during the first minute following insertion of said male portion:
moving said male portion to a disengaged position in which said male portion is disengaged from said cookie dough and back to an engaged position in which said male portion is engaged with said cookie dough at least five times.

11. The method of claim 10 in which said movement to a disengaged position and back to an engaged position occurs between about 8 to 15 times.

12. The method of claim 8 comprising the further steps during the first minute following insertion of said male portion:
moving said male portion to a disengaged position in which said male portion is disengaged from said cookie dough and back to an engaged position in which said male portion is engaged with said cookie dough such that said male portion is in said disengaged position at least 50% of the time during said first minute.

13. The method of claim 12 wherein said male portion is in said disengaged position at least about 75% of the time during said first minute.

14. The method of claim 13 wherein said male portion is in said disengaged position at least about 95% of the time during said first minute.

15. The method of claim 10 wherein said male portion is in said disengaged position at least 50% of the time during said first minute.

16. A method for producing an edible, hand held food product that may be used as a container for ice cream and other frozen confections, comprising the steps of:
preparing a cookie dough;
providing a mold in which said mold includes two concentric portions, a female portion for receiving said cookie dough and a male portion for insertion into said female portion to define a cavity conforming to the desired container configuration;
preheating said mold portions;
placing a measured amount of said cookie dough into said female portion of said mold;
inserting said male portion into said female portion until a gap of at least approximately $\frac{1}{8}$" and not larger than approximately $\frac{1}{4}$" is created between said portions;
baking said cookie dough;
withdrawing said male portion; and
removing said container from said female mold portion by vacuum.

17. The method of claim 16 wherein the step of removing said container by vacuum includes inserting a vacuum plug into said container and drawing a vacuum.

18. The method of claim 17 wherein said vacuum plug has a size and configuration substantially conforming to a portion of said male mold portion and a vacuum hole connected with a vacuum source.

19. The method of claim 16 including placing said containers in a cooling rack.

20. The method of claim 19 including placing said containers in a cooling rack having a plurality of shells provided with cooling holes.

21. An edible, hand held food product that may be used as a container for ice cream and other frozen confections, comprising a shell of baked cookie dough having an upper opening for receiving a serving of said ice cream and other frozen confections and a lower portion with a shape enabling said shell to be hand held, said lower portion including a tapered side wall extending from said upper opening to at least one of a lower point or corner to provide a hand grippable shape to facilitate the hand held characteristic of the product, said shell being at least about $\frac{1}{8}$" thick.

22. The food product of claim 21 wherein said lower portion has a depth dimension at least as great as the diametrical dimension of said upper opening.

* * * * *